Nov. 11, 1924.
C. H. SCHURR
1,515,281
GEAR GRINDING APPARATUS
Filed March 23, 1922  2 Sheets-Sheet 1
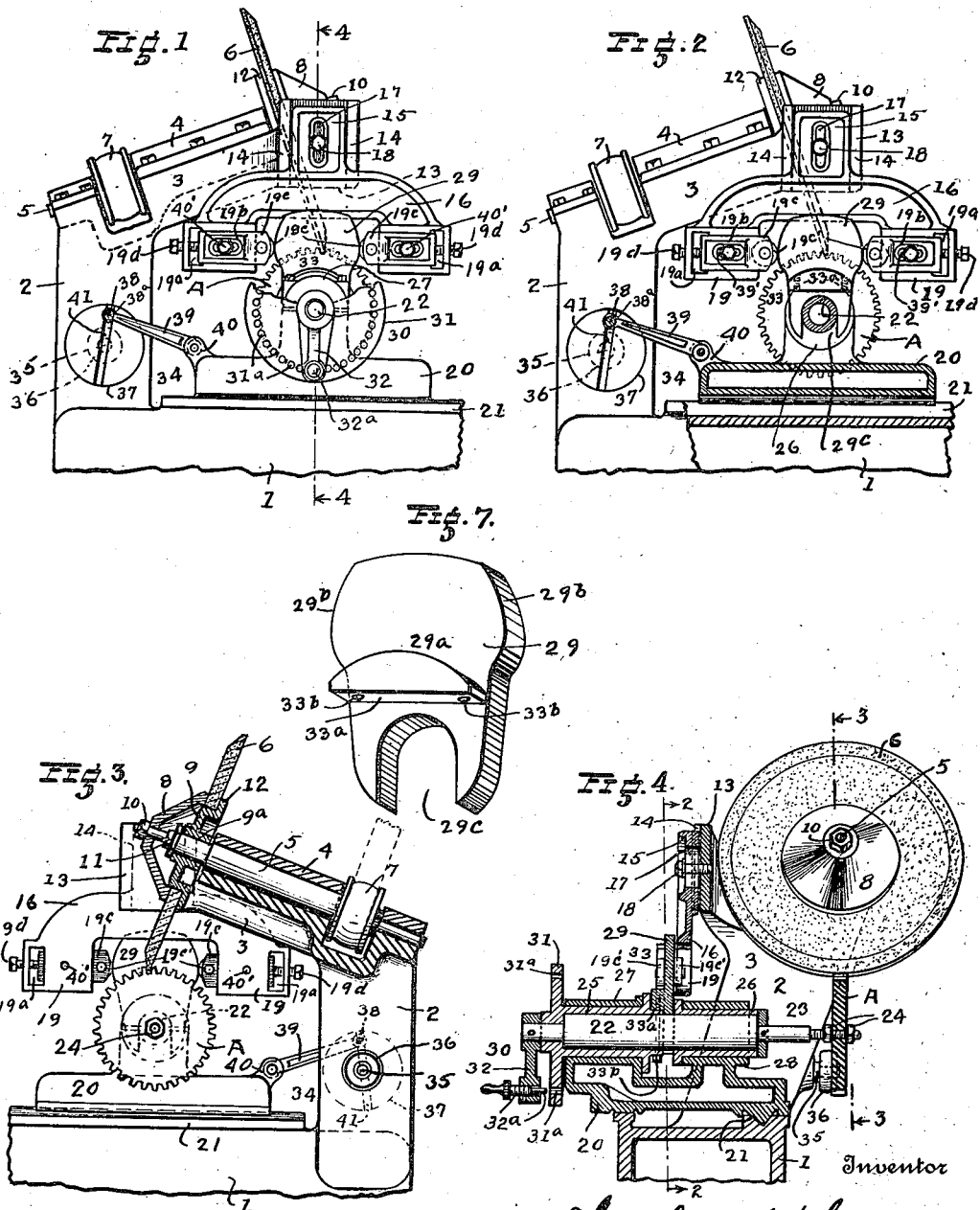

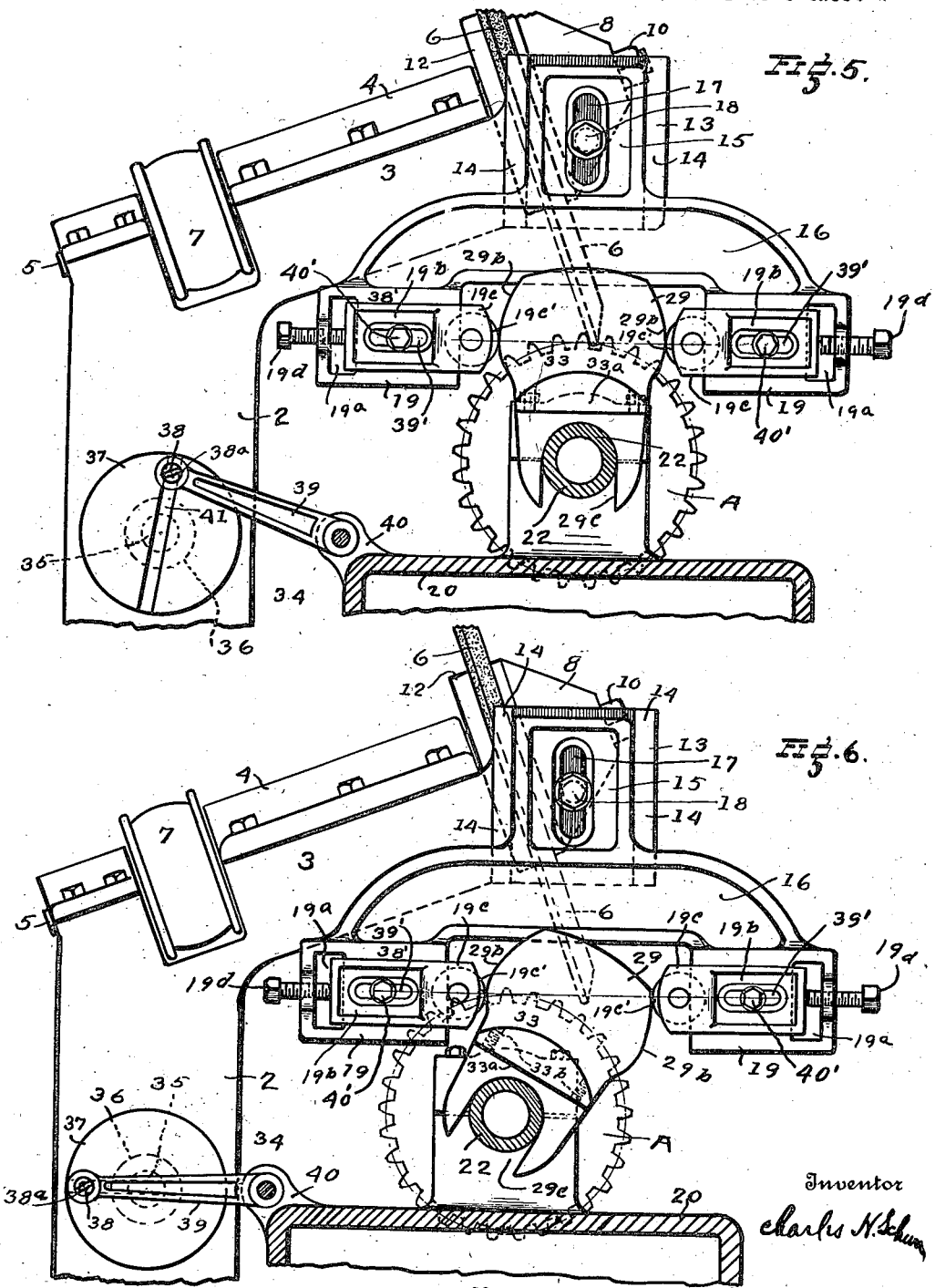

Patented Nov. 11, 1924.

1,515,281

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

GEAR-GRINDING APPARATUS.

Application filed March 23, 1922. Serial No. 546,077.

*To all whom it may concern:*

Be it known that I, CHARLES H. SCHURR, a citizen of the United States, residing at Cleveland, in the county of Cuyahoga and State of Ohio, have invented certain new and useful Improvements in and Relating to Gear-Grinding Apparatus, of which the following is a specification.

This invention relates to an apparatus for grinding or surfacing gear teeth. As illustrating the preferred application of my invention, I have shown it as adapted for grinding gear teeth which have been generated according to the involute rack system.

One object of the invention is to provide a machine of this character of relatively few parts, capable of co-operation to accurately finish or grind gear teeth.

Another object of the invention is to provide an improved machine of relatively simple construction, whereby assembly and replacement of elements for adapting the machine to different sized gears may be readily and easily effected.

Another object of the invention is to provide a gear grinding apparatus wherein novel means are provided for oscillating the gear or gear blank during reciprocating movement of the slide.

Other objects of the invention will be apparent to those skilled in the art to which my invention relates from the following description taken in connection with the accompanying drawings, wherein Fig. 1 is a fragmentary elevational view of an apparatus embodying my invention.

Fig. 2 is a view similar to Fig. 1, but partly in section, substantially on the line 2—2 of Fig. 4.

Fig. 3 is a section on the line 3—3 of Fig. 4.

Fig. 4 is a section on the line 4—4 of Fig. 1.

Fig. 5 is a view substantially similar to Fig. 2, but enlarged.

Fig. 6 is a view similar to Fig. 5, but showing certain of the elements in the position to which they are moved during operation.

Fig. 7 is a perspective view of the cam device.

In the drawings, 1 indicates a frame or bed of any desired construction, for example, such as shown in Patent No. 1,390,145, dated Sept. 6, 1921, and granted to Ernest J. Lees. 2 indicates a standard carried by the frame 1. The standard 2 may be provided with an arm 3, having bearings 4 for a shaft 5. 6 indicates a tool, such as an abrading wheel, secured to the shaft 5 and driven by any suitable means, for example, a pulley 7, driven by a belt (see dotted lines in Fig. 3). The arm 3 is preferably arranged at the desired angle to dispose the abrading surface of the tool 6 at the proper angle of obliquity, but such arm may be mounted for adjustment in any well known manner to arrange the tool at different angles of obliquity as desired; likewise, the standard 2 may be mounted for adjustment vertically in any well known manner as is customary in machines of this character; in fact, the construction of and adjustable mechanism for the arm 3 and standard 2 may be similar to that disclosed in the aforesaid patent, if desired.

The tool 6 preferably comprises an annular disk the abrading or cutting surface of which may be trued by suitable mechanism (not shown). The disk 6 may be of relatively large diameter so as to extend across the tooth face. The shaft 5 preferably extends beyond the outer end of the bearing 4 and carries a pair of clamping members 8, 9, between which the tool 6 is fixed by a nut 10, engaging the free end of the shaft 5. The shaft 5 may be reduced to form a shoulder against which the hub 9ª of the inner clamping member 9 is secured by a nut 11. The clamping member 9 is preferably provided with an inwardly extending wall and a flange 12 which form a suitable seat for the abrading or cutting disk or tool 6.

13 indicates a bracket extending laterally from the standard 2 and provided at or near its outer end with a pair of vertically arranged guide walls 14 to receive and adjustably support the arm 15 of a yoke member 16. The arm 15 is formed with an elongated slot 17. 18 indicates a suitable clamping device, such as a bolt, which extends through the slot 17 and engages a screw threaded opening in the bracket 13 and, when tightened, serves to secure or clamp the arm 15 to the bracket 13. The yoke member extends laterally to either side of the arm 15, its outer or free ends depending downwardly and serving as spaced abutments 19, the purpose of which will be later set forth. 20 indicates a slide mounted in suitable ways 21, provided on the frame 1, whereby the slide may be reciprocated in the manner to be later set forth. 22 indicates a work spindle rotatably mounted on the slide 20. The work spindle 22 is extended beyond the slide 20, as shown at 23, and such extended end may be reduced and provided with screw threads to receive nuts 24, between which the work piece or gear A is clamped in operative relation to the tool 6. The spindle 22 is preferably rotatably mounted in a pair of sleeves 25, 26, which in turn rotatably fit bearings 27, 28, respectively, provided on the slide 20. The bearings are preferably spaced from each other to permit the provision between them of a cam device 29 co-operable with the abutments 19 in the manner to be later set forth. During the operation of the apparatus to grind one side of each tooth of the gear A, the cam device 29 has fixed relationship to the spindle 22, but to permit indexing of the gear A between the grinding of successive teeth the spindle 22 and gear A may be indexed or rotated relative thereto by a suitable indexing mechanism indicated as an entirety at 30.

The indexing mechanism 30 may be of any desired construction, that shown for illustrative purposes comprising a disk 31 provided on the sleeve 25 and formed with an annular series of openings $31^a$ and a crank arm 32 fixed to outer end of the shaft or spindle 22 and carrying a pin $32^a$ which may be actuated successively to project into and be removed from the openings $31^a$, whereby the disk and crank arm may be locked together and then unlocked to permit indexing.

The cam device comprises a body portion $29^a$ shaped along the opposite end edges or walls of its upper portion with a pair of cam surfaces $29^b$, which are disposed between and in co-acting engagement with the abutments 19. The body portion $29^a$ is formed with a slot $29^c$, extending inwardly from its lower end or edge so that the cam device may fit over the work spindle 22 and be removably secured to the projecting end of the sleeve 25 by means indicated as an entirety at 33. The securing means may comprise a lug $33^a$ formed integrally with and disposed on one face of the body portion $29^a$ and arranged to engage a flat surface provided on the end of the sleeve 25, to which surface the lug $33^a$ may be detachably secured by a plurality of cap screws $33^b$ each extending through aligned openings formed in the lug and sleeve end and engaging threads formed in the openings in the latter; this arrangement permitting the removal of one cam device and the provision of another cam device to accommodate the apparatus to different sized gears A.

34 indicates as an entirety means for reciprocating the slide 20 in rectilinear directions. Of the reciprocating means 34, 35 indicates a shaft mounted in suitable bearings preferably supported in a well known manner in an opening formed in and extending through the standard 2. At one end, the shaft 35 carries a pulley 36 to which power is applied to rotate the shaft. At its other end, the shaft 35 carries a crank disk 37 to which a crank pin 38 is fixed. 39 indicates a link pivotally connected to the crank pin 38 at one end, and at its other end pivotally connected to a lug 40 preferably formed integrally on the slide 20. From the foregoing description it will be apparent that the rotation of the shaft 35 will effect a reciprocation of the slide by means of the crank pin 38 and link 39. The crank pin 38 has sliding engagement with the walls of a groove or channel 41 formed in and extending diametrically of the disk 37, the construction being such that by loosening and tightening the screw $38^a$, the pin may be moved to and fixed in any desired position of adjustment endwise of the groove 41, and thereby to adjust the throw of the crank.

In the construction herein disclosed it will be seen that when the slide 20 is moved in one direction and back again, the cam-surfaces $29^b$ will co-act with the abutments 19 which, being fixed in spaced relationship, will cause a rotative movement of the spindle 22 as it moves bodily with the slide in either direction, so that through the co-operation of the reciprocating means and the cam device co-acting with the abutments 19, the gear A is given a rolling movement first in one direction and then in the other relative to the tool 6, whereby the grinding operation is accurately carried out; the elements being so arranged that when the slide 20 moves to the right as viewed in Figs. 1, 2, 5 and 6, to the position shown in this latter figure, the gear A will be out of engagement with the tool 6, at which time the gear may be indexed.

As will be apparent from the foregoing description each cam-surface 29^b is so shaped that in co-acting with the adjacent abutment it will cause rotative movement of the gear while moving bodily according to the generating principle, in order that each gear tooth surface will move through the path of the involute curve as each grinding operation takes place.

It will be noted from the drawings that the abutments 19 are disposed at opposite sides of the work piece or gear A and in a plane that is tangent to the pitch circle thereof and that the points of contact or engagement of the cam surfaces with the abutments are disposed in this plane, and remain at all times therein, as the cam device moves with the work spindle 22. This operation and arrangement permits me to use what may be termed a single tooth gear of the involute type with no pressure angle and to effect, through the co-action of the cam device and the abutments, oscillating movement of the spindle 22 without transmitting pressure thereon in any direction at any angle to the direction of movement of the slide.

By removably supporting the cam-device on the sleeve 25 it can be removed and a different sized cam-device substituted according to the diameter of the gear to be ground; this form of construction being well adapted for grinding gears having diameters of twelve inches or more.

Each of the abutments 19 comprises a box-like chamber 19^a, a plate 19^b slidably fitting the walls of the chamber 19^a and carrying an arm 19^c, and an adjustment device 19^d. The arm 19^c is preferably bifurcated to support a shaft on which a roller 19^c' is loosely mounted, such roller having engagement with the cam-surface and eliminating friction and wear as the cam device operates. The adjustment device 19^d may comprise a screw mounted in the outer end wall of the chamber 19^a and engaging the plate 19^b at its free end.

38' indicates means for clamping the plate 19^b in its adjusted position, such means being preferably provided to insure rigidity and fixed relationship of the plates 19^b. The clamping means 38' preferably comprises an elongated slot 39' formed in the plate 19^b and a capscrew 40' extending through the slot and engaging a screw threaded opening in the adjacent extension of the yoke member 16.

From the foregoing description it will be seen that the abutments 19 may be adjusted relative to each other and in a direction at right angles to the direction of movement of the slide 20, so that they may be disposed in the plane that is tangent to the pitch circle of any gear that is to be ground, and permit contact of the cam device therewith in that plane, whereby co-action between the cam-device 29 and abutments may result to oscillate the spindle without transmitting pressure thereto or the slide 20 at an angle to the direction of movement of the latter.

As both cam surfaces 29^b are maintained in engagement with the abutments 19 and contact therewith at all times in the plane that is tangent to the pitch circle of the gear being ground during reciprocatory movement of the slide 20, positive oscillatory movements are imparted to the spindle, so that accurate grinding operations upon the surfaces of the gear teeth result.

It will also be seen that my construction comprises relatively few parts and such parts are readily adjustable and provide ample room for substitution of the cam device in a ready manner.

To those skilled in the art of making apparatus of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In apparatus of the class described, the combination of a supporting element, a tool rotatably mounted thereon, a slide element mounted on said supporting element, a work carrying spindle rotatably mounted on said slide element, power means acting on said slide to reciprocate it, and means for oscillating said spindle during movement of said slide element, said oscillating means comprising a pair of spaced abutments carried by one of said elements and a cam device carried by the other element and co-acting with said abutments.

2. An apparatus as claimed in claim 1 in which the spaced abutments are carried by the supporting element and the cam device is carried by the slide element.

3. An apparatus as claimed in claim 1 in which the cam device is removable.

4. In apparatus of the class described, the combination with a frame and a tool mounted thereon, of a slide on said frame, means for reciprocating said slide, a work carrying spindle rotatably mounted on said slide, a pair of abutments carried by said frame and a cam device having fixed relationship to said spindle and provided along its opposite ends with cam surfaces disposed between and in co-acting engagement with said abutments, whereby said spindle is oscillated during the movement of said slide.

5. An apparatus as claimed in claim 4 in which the abutments are adjustable toward and from each other and said cam device is removable.

6. An apparatus as claimed in claim 4 in, which the abutments are adjustable in a direction at right angles to the movement of the slide and said cam device is removable.

7. In apparatus of the class described, the combination with a frame and a tool mounted thereon, of a yoke member carried by said frame and provided with extensions which serve as spaced abutments, a slide on said frame, means for reciprocating said slide, a work carrying spindle on said slide, and a cam device having fixed relationship to said spindle and provided with cam surfaces disposed between and engaging said abutments, whereby the spindle is oscillated during movement of said slide.

8. An apparatus as claimed in claim 7 in which the yoke member is adjustable in a direction at right angles to the movement of the slide.

9. In apparatus of the class described, the combination with a frame and a tool mounted thereon, of a slide, a work carrying spindle, a sleeve rotatably mounted on said slide and rotatably supporting said spindle, means for fixedly connecting said sleeve and spindle together during operation, means for reciprocating said slide, a pair of spaced abutments carried by said frame, and a cam device secured to said sleeve having cam surfaces disposed between and in co-acting engagement with said abutments.

10. An apparatus as claimed in claim 9 in which the connecting means between said sleeve and said spindle comprise an indexing mechanism.

11. In apparatus of the class described, the combination of a pair of elements one of which slides relative to the other, a tool carried by the fixed element and arranged at the desired pressure angle for the work-piece to be acted upon, a spindle rotatably mounted on the slidable element and supporting a work piece for operative engagement by said tool, means for reciprocating said slide, and means for oscillating said spindle, the last said means including an abutment supported by one of said elements and a cam device carried by the other element and having cam surfaces co-acting with said abutment, the points of contact between said surfaces and the abutment being disposed at all times in a plane that is tangential to one of the circles of the work piece.

12. In apparatus of the class described, the combination of a pair of elements one of which slides relative to the other, a tool carried by the fixed element, a spindle carried by the slidable element and supporting a work piece for operative engagement by said tool, power means acting on said slide to reciprocate it, and means for oscillating said spindle, the last said means including a pair of abutments fixed in spaced relationship in a plane that is tangential to the pitch circle of the work piece to be ground and carried by one of said elements and the cam device carried by the other element and having cam surfaces contacting with said abutments at points in said plane of tangency.

13. In apparatus of the class described, the combination of a pair of elements one of which slides relative to the other, a tool carried by the fixed element, a spindle carried by the slidable element and supporting a work piece for operative engagement by said tool, power means acting on said slide to reciprocate it, and means for oscillating said spindle, the last said means including a pair of abutments supported by said fixed element in spaced relationship in a plane that is tangential to the pitch circle of the work piece to be ground and a cam device carried by said slidable element and having cam surfaces co-acting with said abutments, the points of contact between said surface and the abutments being at all times disposed in said plane of tangency.

14. In apparatus of the class described, the combination with a frame and a tool carried thereby, of a slide mounted to reciprocate on said frame, a spindle rotatably mounted on said slide and supporting a work piece for operative engagement by said tool, a yoke member fixed to said frame and carrying at its outer ends abutments disposed at opposite sides of said work spindle in a plane that is tangential to the pitch circle of the work piece, power means acting on said slide to reciprocate it, and a cam device movable with said spindle and having cam surfaces contacting with said abutments during movement of the spindle at points disposed in said plane.

15. An apparatus as claimed in claim 14, in which the yoke member is adjustable at an angle to the plane of movement of the slide and the cam device is removable.

16. An apparatus as claimed in claim 13, in which the abutments comprise anti-friction rollers.

17. In apparatus of the class described, the combination of a pair of elements one of which slides relative to the other, a tool carried by one of said elements and arranged at the desired pressure angle for the work piece to be acted upon, a spindle rotatably mounted on the other of said elements and arranged to support a work piece for operative engagement by said tool, means for reciprocating said slidable element, and means for oscillating said spindle during movement of said slidable element, said means including an abutment carried by that element other than the one supporting said spindle and a cam device movable with said spindle and in co-acting engagement with said abutment, the point of engagement being in a plane that is tangential to one of the circles of the work piece.

18. In apparatus of the class described, the combination of a pair of elements one of which slides relative to the other, a tool carried by one of said elements, a spindle carried by the other of said elements and arranged to support a work piece for operative engagement by said tool, means for reciprocating said slidable element, and means for oscillating said spindle during movement of the slidable element, said means including a pair of spaced abutments carried by that element other than the one supporting said spindle and a cam device movable with said spindle and arranged to co-act with said abutments.

In testimony whereof, I have hereunto signed my name.

CHARLES H. SCHURR.